Sept. 5, 1944.  F. A. STAFFORD  2,357,698
SELF FEEDER
Filed May 28, 1941
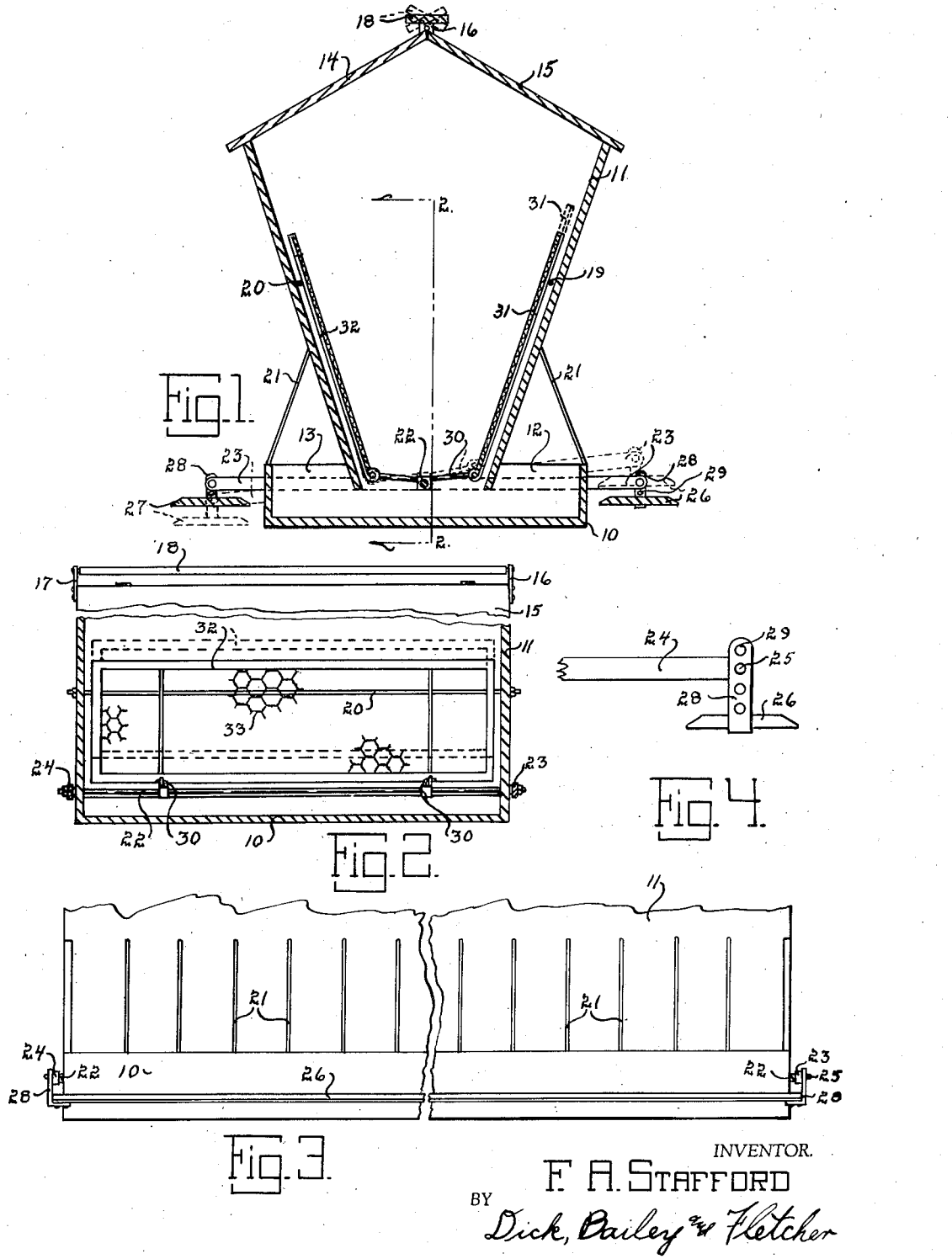
INVENTOR.
F. A. STAFFORD
BY
Dick, Bailey & Fletcher Patented Sept. 5, 1944

2,357,698

UNITED STATES PATENT OFFICE 2,357,698

SELF-FEEDER

Frank A. Stafford, Villisca, Iowa, assignor of thirty-three and one-third per cent to Almira Spiers, Clarinda, Iowa Application May 28, 1941, Serial No. 395,536

7 Claims. (Cl. 119—55)

The principal object of this invention is to provide a self-feeder for farm animals wherein the animals cause the feeding mixture to be agitated, reducing lumps and clots in the material to be fed, thereby assuring the constant flow of material into the feeding trough to the limit of its capacity.

A further object of my invention is to provide a self-feeder having an agitator therein.

A still further object of my invention is to provide a self-feeder having a non-clogging agitator therein, and a counterbalanced platform for operating the agitator that is adjustable to meet varying conditions.

A still further object of this invention is to provide a self-feeder that is economical in manufacture, durable and efficient in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Fig. 1 is an end cross sectional view of my self-feeder ready for use.

Fig. 2 is a longitudinal cross sectional view of the feeder and is taken on the approximate line 2—2 of Fig. 1.

Fig. 3 is a side elevational view of the lower portion of the feeder and more fully illustrates its structure.

Fig. 4 is an enlarged side end elevational view of the treadle and actuating arm showing the method of adjusting the treadles.

Heretofore, self-feeders have been made which are gravity operated or which have some type of revolving agitator therein for assuring a flow of feeding materials into the trough. Generally these have not been operated by the feeding poultry or livestock but, as in the case of a hog feeder, have been operated by the hog rubbing against a portion of the feeder mechanism. These methods do not adequately agitate the feeding material, with the result that the mechanism clogs frequently and in the case of a poultry feeder, the force of gravity is relied on entirely to bring the feeding material down into the troughs. Obviously this is an unsatisfactory method and results in a great deal of waste as well as being unreliable in its action. I have overcome such disadvantages as will be appreciated and as will be hereinafter more fully set forth.

Referring to the drawing, I have used the numeral 10 to indicate a feeder trough having a hopper 11 in communication therewith as shown in the drawing. This housing or hopper has its side walls sloping downwardly and inwardly, its bottom open and terminating above the bottom of the trough 10. The hopper 11 has its lower end of a width less than the width of the trough 10 for providing the feeding openings 12 and 13 on each of its sides. The numeral 14 indicates a top placed over the hopper 11 having the hinged filling lid 15 and the upwardly extending pivot brackets 16 and 17 as shown in the drawing. The numeral 18 indicates a tilting board or anti-roost device pivotally supported between the bracket members 16 and 17. This anti-roost board prevents poultry from roosting on top of the feeder and also acts as a cover over the hinged joint between the top portion 14 and door 15. Should poultry attempt to roost on the bar 18, it will tilt, thereby effectively preventing fowl from roosting on the ridge of the device. The ends and side pieces of the feeder are held together by the tie rods 19 and 20 and the trough openings 12 and 13 are divided in sections by the use of rods or wires 21 as shown in Figs. 1 and 3 of the drawing. I have used the numeral 22 to indicate a shaft running through the longitudinal center of the feeder adjacent the lower end of the hopper 11. The numerals 23 and 24 indicate arms secured to the outer ends of the shaft 22 and external of the feeder. These bars 23 and 24 run across the feeder and extend out on either side and have a lug 25 on each of their extremities. The numerals 26 and 27 indicate two treadle boards positioned on either side of the troughs 12 and 13 respectively and parallel with their length. These boards are fitted with resilient bracket members 28 having a series of holes 29 therein. Each of these treadles is suspended between the extremities of the bars 23 and 24 so that poultry or other feeding livestock will have to place their feet on the treadles, thereby causing the bars 23 and 24 to pivot and turn the shaft 22. The numeral 30 indicates arms secured to the pivot 22 at points adjacent the end walls of the hopper 11 as shown in Fig. 1 of the drawing. The numerals 31 and 32 indicate agitators having their lower ends pivotally secured to the outer ends of the arms 30, resting substantially parallel to the side walls of the hopper 11 and sliding upon the tie rods 19 and 20 as shown. The numeral 33 indicates a wire grill within the agitators 31 and 32 and which may be constructed of ordinary chicken wire or the like.

The practical operation of my device is as follows:

The hopper 11 is filled with feed and the feed will come down through the open bottom portion of the hopper and into the trough 10, flowing out to either side of the hopper proper. Occasionally if the feed has absorbed moisture, there will be a tendency for it to clog and not enter the trough portions, but as the feeding poultry rests upon the platforms 26 and 27, the weight will always be uneven causing the arms 23 and 24 to teeter, thereby operating the shaft 22 and sliding the agitator grills 31 and 32 in one direction or the other as shown by dotted lines in Fig. 1. This action constantly agitates the feed reducing any lumps or clots and permitting the feed to flow into the trough 10. The shifting motion of the two agitators prevents the material from clogging on the agitator inasmuch as each reciprocation of the arms moves the agitator in a different direction and the screen grill permits the feed to pass through the grill if necessary and also helps break up the material.

Thus it will be seen that I have provided a self-feeder that is actuated by the feeding livestock, that prevents clogging of the feeding material, and one that requires no attention other than the periodical filling of the hopper. Furthermore, the anti-roosting device prevents poultry roosting on top of the feeder and the dividing members 21 tend to force the poultry to feed from a small portion of the feeder trough. The treadles may be adjusted depending upon the amount of poultry feeding from the device, and if it is desired to have a short agitator travel, the brackets 28 may be sprung and the lug 25 fitted into a higher hole in the bracket so that it will have a shorter travel. Obviously my device may be used with single or multiple trough feeders.

Some changes may be made in the construction and arrangement of my improved self-feeder without departing from the real spirit and purpose of my invention, and it is my intention to cover by my claims any modified forms of structure or use of mechanical equivalents which may be reasonably included within their scope.

I claim:

1. In a self-feeder, a hopper, a trough member positioned below said hopper and in communication therewith, an agitator in said hopper, a shaft operatively connected to said agitator and extending through the end walls of the feeder, arms secured to the ends of said shaft, treadle mechanisms pivotally secured to the ends of said arms and resting adjacent the trough member so that when one of said treadle mechanisms is depressed said shaft will be actuated, thereby actuating said agitator, and a means for adjusting the treadle mechanism relative to said arms for lengthening or shortening the treadle throw.

2. In a device of the class described, a trough member, a hopper having its lower end open and in communication with a portion of said trough member, agitator members inside said hopper and each comprising an open wire mesh suitably supported, an operating shaft in said hopper, arms rigidly secured to said shaft and operatively secured to said agitator members, operating arms secured to the outer ends of said shaft, and adjustable treadle mechanisms on the ends of said arms adjacent said trough member for actuating said shaft and said agitators when one of said treadle mechanisms is depressed.

3. In a device of the class described, a trough member, a hopper having its lower end open and in communication with a portion of said trough member, agitator members inside said hopper and each comprising an open wire mesh suitably supported, an operating shaft in said hopper extending through the end walls thereof, arms rigidly secured to said shaft and operatively secured to said agitator members, operating arms secured to the outer ends of said shaft, adjustable treadle mechanisms on the ends of said arms adjacent said trough member for actuating said shaft and said agitators when one of said treadle mechanisms is depressed.

4. In a self-feeder, a hopper, an agitator mechanism consisting of a pair of relatively flat surfaces mounted within the hopper in inwardly sloping inclined relation and adapted to reciprocate, a trough for receiving feed from the hopper, and treadle means independent of the trough and hopper for actuating the agitator mechanism.

5. In a self-feeder, a hopper, an agitator mechanism consisting of two relatively flat surfaces mounted within the side walls of the hopper and operatively connected at the bottom thereof for reciprocal movement, a trough for receiving feed from the hopper, and treadle means independent of the hopper and trough for actuating the agitator mechanism.

6. In a self-feeder, a hopper, a trough below the hopper, a pair of agitators mounted in the hopper in an inclined relation, each agitator being adjacent to a side wall of the hopper, said agitators being operatively connected to a common axis at their lower ends and adapted to reciprocate and a treadle mechanism independent of the trough operatively connected to the common axis of the agitators to actuate said agitators.

7. In a self-feeder, a hopper having inwardly inclined side walls, a pair of agitators mounted in an inwardly inclined relation to each other, each agitator being adjacent to a side wall of the hopper, said agitators being operatively connected at other lower ends and adapted to reciprocate in opposite directions, a treadle mechanism operatively connected to the lower ends of the agitators, and a trough member below the hopper and extending beyond the sides thereof, the treadle mechanism being independent of the trough.

FRANK A. STAFFORD.